United States Patent [19]

Mihalakis, deceased et al.

[11] Patent Number: 4,498,734
[45] Date of Patent: Feb. 12, 1985

[54] MEANS AND METHOD OF CONTROLLING REFLECTED IMAGE CONTAINMENT

[75] Inventors: Agis I. Mihalakis, deceased, late of San Luis Obispo County, Calif.; by Barbara L. Friend, legal representative, Cody, Wyo.

[73] Assignees: William C. McGeehon; George Mihalakis, ; a part interest

[21] Appl. No.: 417,709

[22] Filed: Sep. 13, 1982

[51] Int. Cl.³ .............................................. G03B 21/56
[52] U.S. Cl. .................................................... 350/125
[58] Field of Search ............... 350/117, 125, 123, 129; 52/6, 33, 174

[56] References Cited
U.S. PATENT DOCUMENTS 2,763,184 9/1956 Jackson ............................... 350/129
4,241,980 12/1980 Mihalaski et al. ................... 350/129

Primary Examiner—L. T. Hix
Assistant Examiner—Brian W. Brown
Attorney, Agent, or Firm—Lyon & Lyon

[57] ABSTRACT

A means and method primarily for the control of a projected image reflected from an optical screen, such as the screen of an outdoor or drive-in theater, whereby the contour of the optical screen surface is adjustable so that a picture originating at a projector is confined within a specific audience viewing area; and further, extraneous light, such as sun rays, are reflected from the optical screen onto an area separate from the viewing area thereby minimizing interference with the projected picture and permitting the showing of a picture outdoors in daylight, or other brightly lighted areas.

16 Claims, 14 Drawing Figures

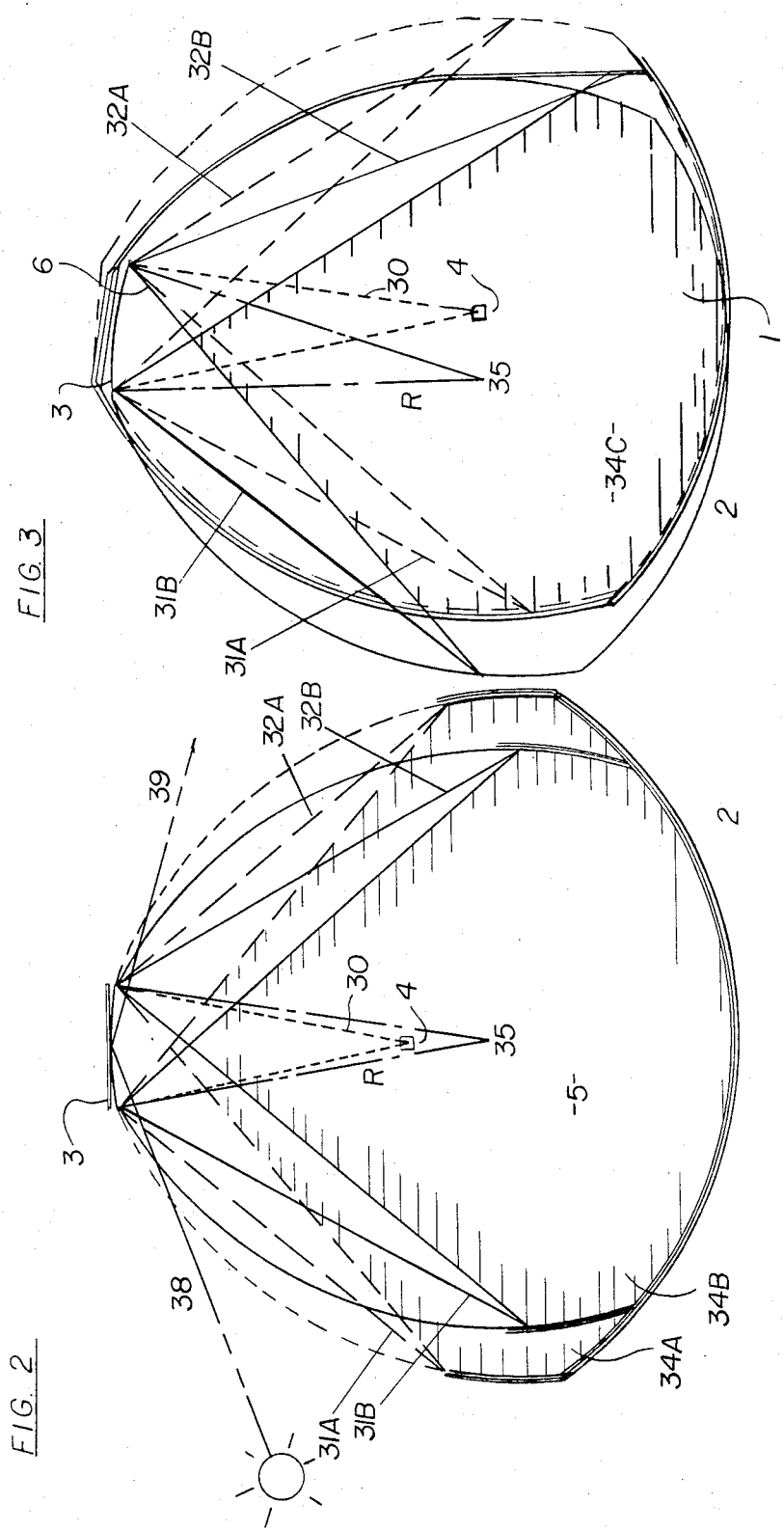

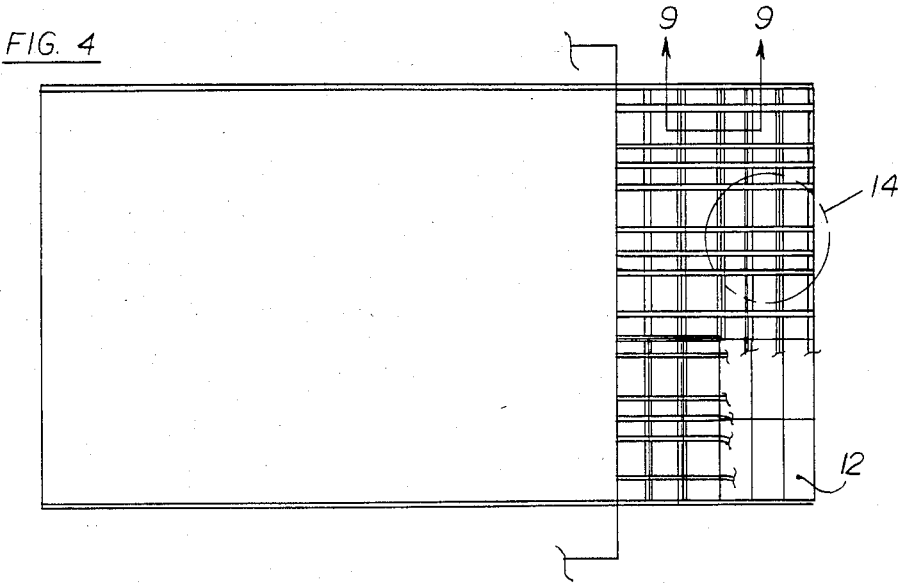
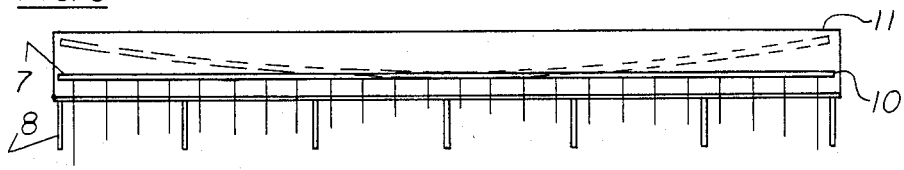
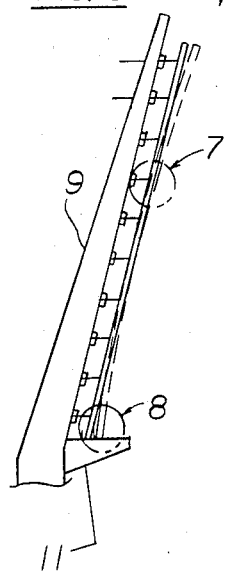
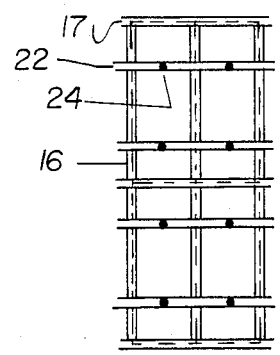

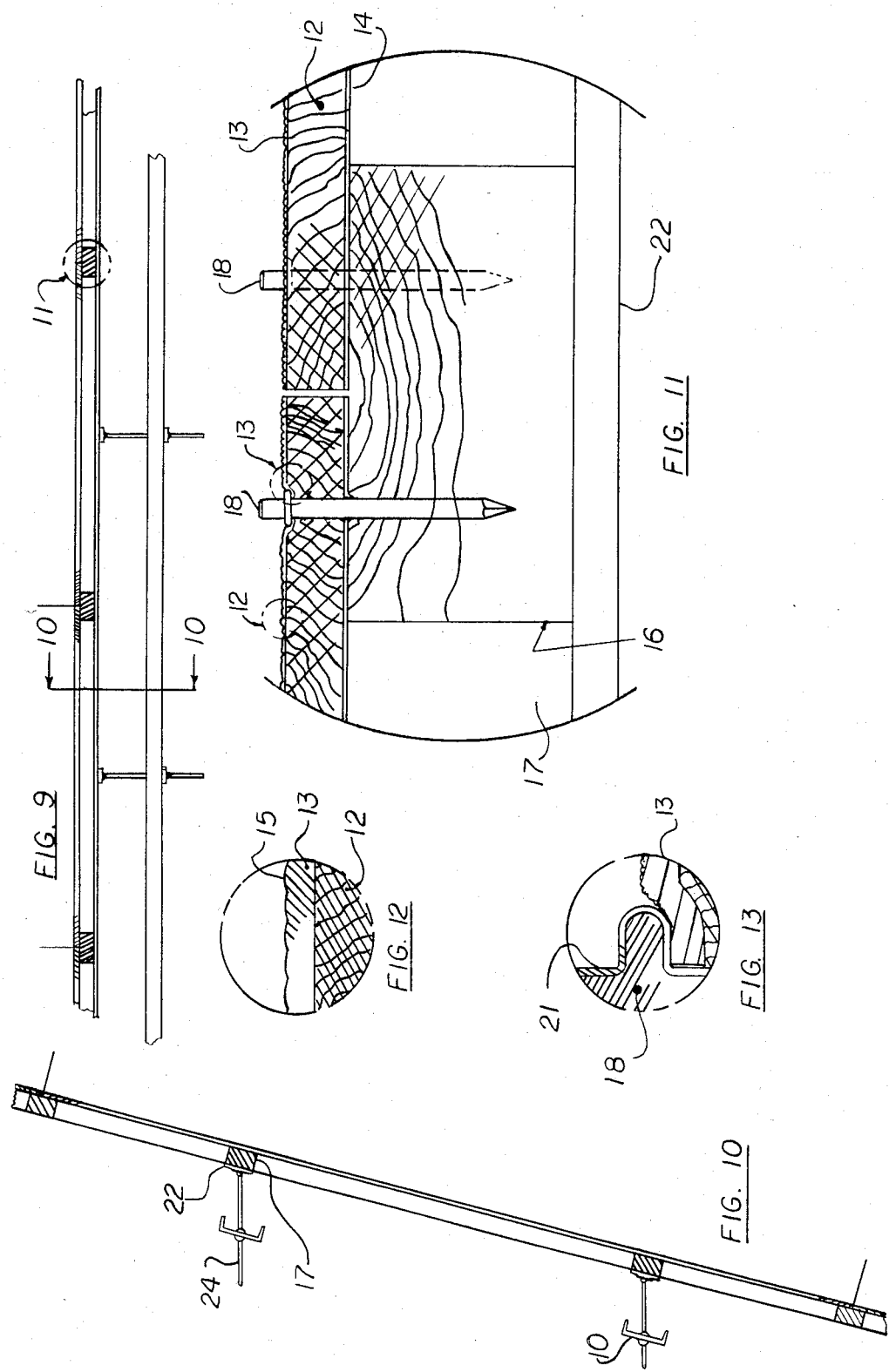

MEANS AND METHOD OF CONTROLLING REFLECTED IMAGE CONTAINMENT

BACKGROUND OF THE INVENTION

Optical screens intended primarily for outdoor use are disclosed in U.S. Pat. Nos. 2,804,801; 2,984,152; and 3,063,339, and an optical contour unit suitable for incorporation in an optical screen is disclosed in U.S. Pat. No. 4,241,980. Such optical screens are essentially planar and fixed in position with the result that the area within which a reflected picture may be viewed has been substantially greater than the area occupied by the intended audience. Thus, if such optical screens are installed in an outdoor or drive-in theater, the area within which the picture or image can be seen includes a peripheral area outside the theater. Also, while extraneous light, as from the sun, is subject to some control by such optical screens, a more select control is essential to the furtherance of its applicability to irregularly shaped theater enclosures, and to realize optimum daylight or ambient light resistance.

SUMMARY OF THE INVENTION

The present invention is directed to a means and method of controlling screen projected image containment which may utilize the types of projector screens such as disclosed in U.S. Pat. Nos. 2,804,801; 2,984,152; 3,063,339 and 4,241,980, and is summarized in the following objects:

First, to provide a means and method which is particularly applicable for use in outdoor or drive-in (but is not limited thereto) theaters whereby the optical screen may be changed in shape so that the viewing are a may be confined entirely to the intended audience region so the picture image cannot be seen outside the theater, and may be readily adjusted to the pattern of the audience area of individual theaters even though such pattern may be asymmetrical, have boundary irregularities, or require isolation from other such regions produced by other screens within the enclosure.

Second, to provide a means and method whereby extraneous light rays, such as sun rays, which impinge on the optical screen may be reflected into an area separate from the viewing area so that the picture image directed into the audience area is essentially unaffected by sunlight, thus permitting daytime operation of the theater.

Third, to provide a means as indicated in the preceding objects wherein the screen is initially flat or conforms to a predetermined regular contour and includes a plurality of means for effecting local change of its contour after erection in a particular theater for accommodation to the variations in audience area, and incorporates a method whereby an image is observed from selected positions about the periphery of the audience area and corresponding portions of the optical screen are adjusted on the basis of such observations.

Fourth, to provide an optical screen and means of image containment wherein the screen is divided into segments capable of limited flexure, the segments being backed by a mounting structure also capable of limited flexure which is, in turn, backed by a rigid framework and connected thereto by a plurality of adjustment devices which move corresponding portions of the optical screen forwardly or rearwardly to curve the optical screen both vertically and horizontally or in either direction.

Fifth, to provide for the screen as described in the foregoing objects, a means of securing it once adjusted, thus rendering it permanent and rigid in the adjusted state.

Sixth, to provide an improved optical screen structure.

FIG. 2 is a diagrammatical plan view showing by dash lines an angular field of projection emanating from a projector and reflected by a flat optical screen or screen of minimum curvature, and indicating by solid lines the boundaries of reflected rays from an optical screen of increased curvature, and still further indicating by broken lines ray courses of patterns emanating from sunlight.

FIG. 3 is another diagrammatical plan view indicating by dash lines a laterally constricted by symmetrical ray boundary pattern corresponding to the solid line configuration of FIG. 2 and indicating by solid line an asymmetrical pattern which results if the screen is turned about a vertical or essentially vertical axis.

FIG. 4 is an essentially diagrammatical back view of the optical screen shown in its planar condition.

FIG. 5 is a substantially diagrammatical top view thereof indicating by solid lines the planar condition of the optical screen and by dash lines the curved condition, the degree of curvature being exaggerated for purposes of illustration.

FIG. 6 is a substantially diagrammatical view taken from one end of the optical screen, the screen being shown by solid lines in its planar conditions and by dash lines in a concave contour, again the degree of curvature being exaggerated for purposes of illustration.

FIG. 9 is an enlarged fragmentary section view with portions in plan taken from 9—9 of FIG. 4.

FIG. 10 is a fragmentary sectional view taken through 10—10 of FIG. 9.

FIG. 11 is a further enlarged fragmentary sectional view taken within circle 11 of FIG. 9.

FIG. 12 is a still further enlarged fragmentary sectional view taken within circle 12 of FIG. 11.

FIG. 13 is a still further enlarged fragmentary sectional view taken within circle 13 of FIG. 11.

FIG. 14 is an enlarged fragmentary sectional view taken within circle 14 of FIG. 4 and shows (as dots) selected horizontal thrust rods.

SPECIFICATION

The present invention is directed primarily to an outdoor theater and means and method of adjusting the contour of an optical screen; however, the invention has a wider range of uses as will be apparent to those skilled in the art.

Figure 1:
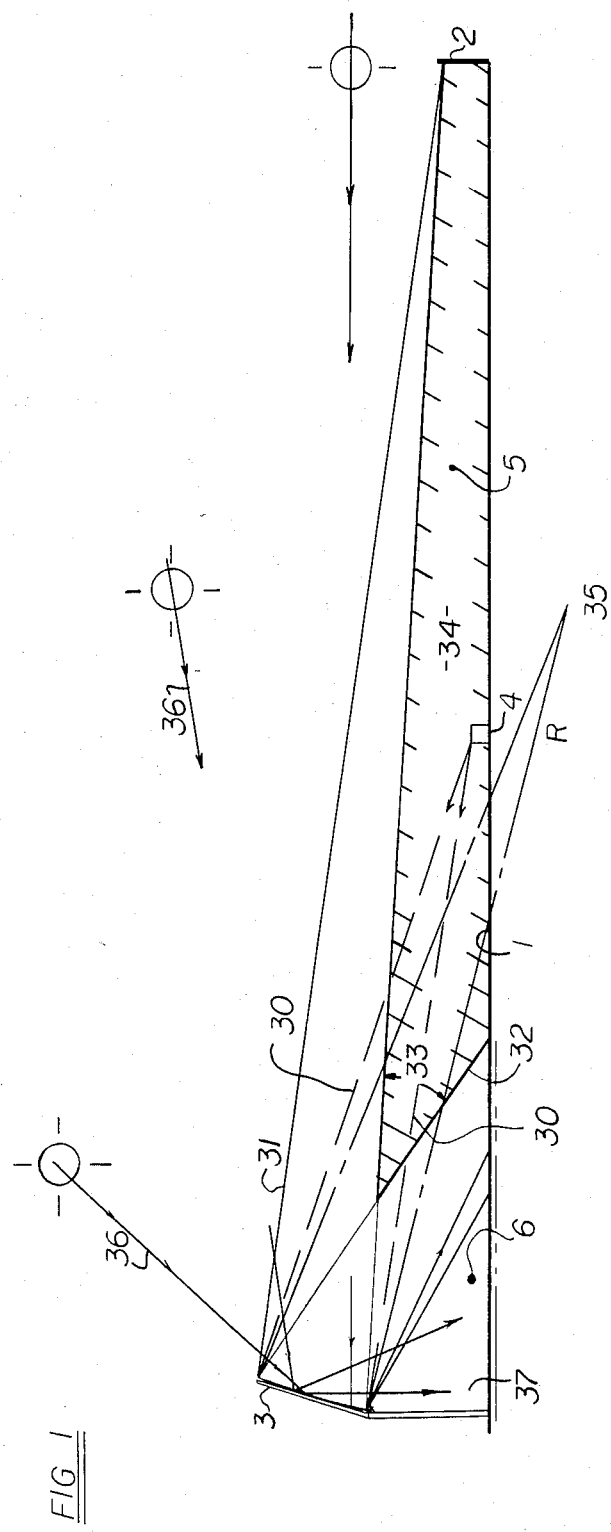
FIG. 1 is a diagrammatical side view of an outdoor theater showing the manner in which an image is projected onto an optical screen and reflected therefrom into an audience area, and also indicating the manner in which sun rays are deflected into a region outside the audience area, with R the radius of the vertical bow of the screen.

The embodiment herein illustrated in FIG. 1 is directed to an outdoor theater and includes a theater floor 1 having a wall or fence 2 and an optical screen 3 at one end of the enclosure. As will be brought out more fully, rays from a projector 4 are reflected by the screen 3 into an audience area 5 which may vary in area depending upon the contour of the optical screen. Also enclosed by the wall is an extraneous ray impingement area 6.

The optical screen is supported by an underlying supporting structure 7 (see FIG. 5) and is adjustably mounted with respect to a rearward mounting structure 8 carried by the supporting structure 7. The rearward mounting structure 8 is relatively rigid and includes vertical frame members 9 (FIG. 6) and horizontal frame members 10 (FIG. 5). At its lower margin, there is an optionally provided forwardly directed platform 11 (FIG. 6).

Figure 7:
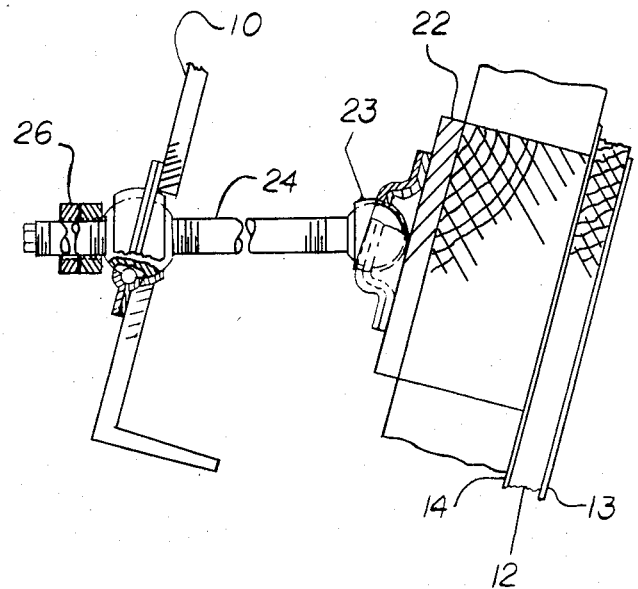
FIG. 7 is an enlarged fragmentary section view with portions in elevation taken within circle 7 of FIG. 6 to show a typical adjustment means for varying the curvature of the optical screen.

The optical screen includes a plate structure comprising a plurality of contiguous panel members 12 as seen in FIG. 4 arranged in rows and columns. Each panel member 12 may be formed of a substrate which has been prepared for use in the intended environment and has a limited degree of flexibility. Secured to the face side and optionally to the reverse side of each panel member 12 are reinforcing laminations 13 and 14 (FIG. 7).

The front lamination 13 is covered with a lenticulated specular imaging lamination 15 as indicated in FIG. 12; that is, the surface of the lamination 15 is undulated in accordance with an optical pattern such as more fully described in the aforementioned patents in the background section. The most favorable optical contour is that disclosed in U.S. Pat. No. 4,241,980.

The back side of the plate structure is reinforced by vertical reinforcing bars 16 and horizontal reinforcing bars 17 (FIGS. 14, 10). These bars are preferably formed of high-grade wood known as marine lumber, which have been treated for outdoor exposure. While wood is preferred because of its relatively low cost and because it has adequate but limited flexibility, it should be understood that other materials, either metal or plastic having similar flexure characteristics and strength, may be used.

In the wooden construction method illustrated, referring particularly to FIG. 11, the margins of each panel member may be joined to its corresponding bars 16 and 17 by nails 18 or screws (not shown). Preferably the nails or screws are of the double head type, having an outer head 19 and an inner head 20. The depth at which the nails are driven into the panel member 12 through the reinforcing laminations 13 and 14, as well as the specular lamination 15 (FIG. 12), is such that the inner head 20, while contacting the specular lamination 15, does not penetrate the panel member 12. Furthermore, the nails 18 are covered with a seal coating 21, which compresses and provides a seal between the inner head 20 and the panel member 12, as indicated in FIG. 13.

Selected horizontal reinforcing bars 17 are provided with horizontal mounting strips 22 as seen in FIG. 10, formed of metal having a limited degree of flexibility. Disposed in spaced relation along each mounting strip 22 is a series of pivotal connections such as, but not limited to, universal or ball joints 23 (FIG. 7) which are joined to thrust members 24. The thrust members extend through the horizontal frame members 10 and receive suitably mounted traveler nuts 26 or other longitudinal adjustment means. If traveler nuts are used, lock nuts may be provided.

Figure 8:
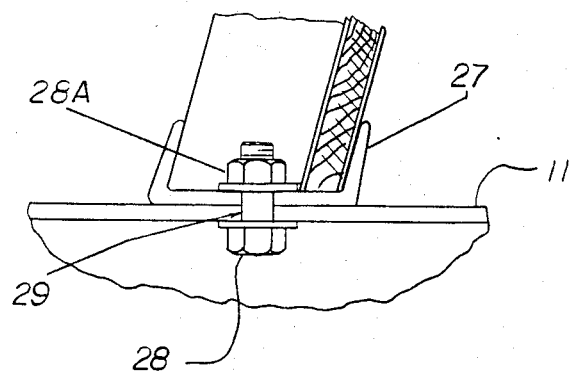
FIG. 8 is an enlarged fragmentary sectional view taken within circle 8 of FIG. 6.

The lower margins of the panel member 12 can be fitted in a base channel member 27 (FIG. 8) capable of some degree of flexure. The channel member is secured by anchor bolts 28 and lock nuts 28a fitted in slots provided in the platform 11.

The optical screen 3 formed by the rows and columns of panel members 12, frame members 16 and 17 and strips 22 has, as a whole, limited flexibility. In addition, the screen is capable of still more limited regional flexibility. The thrust members 24 and their pivotal connections with the panel members 12 and strips 22 form a set of connecting means which may be individually extended or retracted to extend or retract corresponding regions of the optical screen. This is accomplished, however, without abrupt changes in contour of the optical screen, but instead the curvatures of each region blend into the curvatures of adjacent regions. If screw-threaded thrust rods are employed, the optical screen is rigidly retained in a selected contour; however, the lock nuts 26 further insure that the optical screen is rigidly secured in any adjusted position.

The platform 11 provides vertical support and the anchor bolts 28 and their lock nuts 28a, when secured, provide further rigidity. Thus, when adjusted, the optical screen becomes a fixed, essentially rigid structure.

Reference is now directed to the diagrammatical views, FIGS. 1, 2 and 3. Referring to FIG. 1, the vertical boundaries of a beam emanating from the projector 4 are designated by long dashed lines 30. The remote diverging boundaries of the rays reflected from the optical screen 3 are designated 31, the initially converging boundaries are designated 32, and continue beyond their point of intersection as second diverging boundaries, designated 33. The second diverging boundaries 33 define with the theater floor 1 and portions of the fence 2 a field of total containment, represented by the shaded area in FIG. 1, and designated 34.

The term "total containment" is intended to mean the containing or confining of the reflected image within a prescribed volume of space. That is, the image cannot be adequately seen outside the boundaries of such space.

Referring to FIG. 2, the planar boundaries 30 of the projector beam and the planar boundaries of the reflected electromagnetic waves from the optical screen when in its flat or minimum curvature condition are designated, respectively, 31a and 32a, and similarly the corresponding reflected rays from the optical screen 3, when adjusted to provide an average lesser radius, are designated 31b and 32b. In the case of the optical screen 3 adjusted to its flat or minimal curvature condition, the field of total containment is designated 34a, whereas the field of total containment resulting from the adjustment of the screen to greater curvature is designated 34b.

As indicated in FIG. 1, the optical screen 3 is tilted so that the nominal center of curvature 35 is below the theater floor. The actual distances, or course, are dependent upon the degree of curvature. By tilting the screen, the upper boundary of the field of total containment slopes downward as does also the upper boundary ray 31. A rear wall 2 may then be located so that a picture emanating from the optical screen cannot be seen outside the wall even when viewed above the top level of the wall. If the screen were flat, the distance may be excessive. By curving the screen in its essentially vertical direction, this distance is reduced. Similarly, by increasing the rate of curvature in a horizontal direction, the lateral boundaries of the field of total containment are drawn inward.

In FIG. 2, the fields of total containment 34a and 34b, as defined by lines 31A-32A and lines 31B-32B, are indicated as symmetrical. In some cases, an asymmetrical field of total containment is required. In this respect, reference is made to FIG. 3 in which the symmetrical configuration represented by similar boundaries 31A-31B and 32A-32B is indicated for comparison. By rotating the optical screen 3 so that its center of curvature 35 is at one side of the projector, an asymmetrical field of total containment designated 34c may be obtained, and thus permit the theater to fit into the space not otherwise suitable.

The problem of fitting the field of total containment into available space cannot, in many instances, be solved merely by placing the optical screen in asymmetrical relation or angular relation to the projector. However, by use of the thrust members 24 and associated elements located in a pattern between the optical screen 3 and mounting structure 8, precise adjustment may be obtained.

Except for difference in the overall dimensions, the same optical screen construction and the mounting structure may be used for all open air theaters. The optical screen is initially installed in a flat condition or in a predetermined concave condition. The fence or wall 2 may be erected according to the available boundaries of the theater. An image is projected onto the screen and is viewed from selected peripheral positions. Then, by appropriate communication between the observer and an operator positioned behind the optical screen, appropriate thrust members 24 are adjusted to change the curvature of the screen or angular position of the screen in a region from which rays emanate to the point of observation. Once the correct curvature has been attained, the lock nuts 26 and 28a, or other rigidizing method, are secured so that the screen structure becomes an essentially rigid structure.

It should be noted that by use of an optical screen having optical units as set forth in U.S. Pat. No. 4,241,980 the boundary line between a position of total image visibility and a position in which no image is visible is reduced to a distance of a very few feet or even inches.

The adjustment of the screen to control the field of total containment also has the effect of minimizing or eliminating reflections of ambient light originating outside the field of total containment; for example, sun rays from being reflected into the field of total containment. Thus, referring again to FIG. 1, vertical incident sun rays 36 are reflected downward as indicated by 37 into the region forwardly of the field of total containment, that is, into the extraneous ray impingement area 6 forwardly of the audience area 5 which is within the boundaries of the field of total containment. Lateral incident sun rays 38, as indicated in FIG. 2, are also reflected as indicated by 39 outside the field of total containment and, depending upon the vertical component of such rays, are reflected to the area 6 or entirely outside the theater boundaries.

It is essential, particularly for daylight or high ambient light viewing of the optical screen, that the region or area 6 have a light absorbing surface. This is true also of the surfaces within the field of total containment, including the theater floor 1 and the wall or fence 2.

While particular embodiments of this invention have been shown and described, it is not intended to limit the same to the details of the construction set forth, but instead, the invention embraces such changes, modifications and equivalents of the various parts and their relationships as come within the purview of the appended claims.

What is claimed is:

1. Means for adjusting an optical reflecting surface and the energy falling incident thereon, comprising:
   a. a rigid mounting structure;
   b. a flexible multi-panel structure disposed in front of the mounting structure;
   c. means forming a reflection surface on the flexible multi-panel structure for a preselected field of reflected energy distribution;
   d. a plurality of connecting means spaced in accordance with a preselected pattern and extending between the mounting structure and the flexible structure, each connecting means being individually extendable and retractable to effect adjustment in the position of a corresponding region of the flexible multi-panel structure whereby the flexible multi-panel structure may be effectively curved to change the presented field of reflected energy distribution; and
   e. means for securing the flexible multi-panel structure once the desirable curvature is achieved, thus rendering it rigid.

2. A means as defined in claim 1, wherein:
   a. the spectrum range of the reflecting surface corresponds to the visible light range of the electromagnetic spectrum;
   b. the mounting structure and flexible structure are inclined from the vertical;
   c. the connecting means provide an adjustable curvature to the reflecting surface; and
   d. the flexible structure is locked permanently in the desired curvature.

3. A means as defined in claim 1, wherein the flexible multi-panel structure comprises:
   a. a plurality of contiguous, essentially rectangular panels each capable of limited flexibility; and
   b. frame members, also having limited flexibility, backing the panels along their contiguous margins.

4. A means as defined in claim 3, wherein the connecting means comprises:
   a. adjustable members extending between the mounting structure and selected frame members of the flexible structures;
   b. flexible connections between the adjustable members, mounting structure and panel structure; and
   c. means for locking the adjustable connections after adjustment.

5. A means as defined in claim 4, wherein:
   a. the mounting structure and multi-panel structures are disposed in an approximately vertical position; and
   b. an adjustable platform supports the panel structure.

6. An open-air theater, comprising:
   a. an upwardly open enclosure encompassing an audience area;
   b. a supporting structure at one end of the enclosure;
   c. a mounting structure disposed on the supporting structure in elevated relation to the enclosure;
   d. a flexible multi-panel structure disposed in front of the mounting structure;
   e. an optical reflection screen forming the front surface of the multi-panel structure;
   f. a plurality of connecting means spaced in accordance with a predetermined pattern and extending respectively between the mounting structure and multi-panel structure;

g. the mounting structure, flexible multi-panel structure, and optical screen occupying a tilted position directed into the enclosure;

h. each connecting means being individually extensible and retractable to adjust corresponding respective panels of the multi-panel structure and optical screen forwardly or rearwardly, the multi-panel structure and optical screen being flexible and the panels thereof being connected to permit the multi-panel structure and optical screen to assume a curvature;

i. selected connecting means being adjustable to effect sufficient curvature of the optical screen surface as to confine the reflection therefrom of a light projected thereto to the area within the enclosure, and j. a projector for projecting images into the audience area.

7. An open-air theater, as defined in claim 6, wherein:
a. the curvature of the optical screen, as adjusted to reflect images into the audience area, also reflects extraneous light falling incident thereon from outside the theater into a region within the enclosure and separate from the audience area; and
b. means forming a light absorbent surface covering said region.

8. An open-air theater, as defined in claim 6, wherein the multi-panel structure comprises:
a. a plurality of relatively thin, preferably rectangular panels disposed in contiguous relation and each having limited flexibility; and
b. frame members, also having limited flexibility, backing the panels along their contiguous margins.

9. An open-air theater, as defined in claim 8, wherein:
a. each of the panels is formed of a flexural substrate;
b. frame members are formed of materials with limited flexibility, and
c. mechanical or physical panel attachment is employed.

10. An open-air theater, as defined in claim 8 wherein:
a. a supporting structure is disposed under the multi-panel structure;
b. the lower edge of the multi-panel structure is slidable therein during contouring of the multi-panel structure; and
c. fastener means secures the multi-panel structure in its contoured condition.

11. An open-air theater, comprising:
a. an upwardly open enclosure encompassing an audience area;
b. an inclined optical screen having a surface comprised of specular reflecting elements;
c. a projector within the enclosure for projecting an image onto the optical screen; and
d. said optical screen having a screen surface support structure formed by a multiplicity of individual contiguous adjustable panels which are individually adjustable to provide an effective contour proportioned to confine the reflected image to said audience area.

12. An open-air theater, as defined in claim 10, wherein:

a. the contour of the optical screen also reflects extraneous light originating from regions outside the enclosure into a region within the enclosure and separate from the audience area; and
b. a light absorbing coating within the audience area.

13. Means for producing reflections within a preselected spectrum range and containing such reflections within a selected area, comprising:
a. a mounting structure;
b. a multi-panel structure comprising a plurality of adjacent support panels each having limited flexibility;
c. means forming a reflecting surface on the multi-panel structure; and
d. means adjustably connecting panels of the multi-panel structure to the mounting structure for allowing adjustment of the contour of the reflecting surface to effect confinement of the reflections therefrom within a selected area.

14. A method of controlling the area in which reflections from a reflecting surface are contained, wherein the contour of the reflecting surface is locally adjustable, characterized by:
a. projecting incident rays of a selected range of wavelengths onto a reflecting surface for reflection therefrom;
b. controlling signal reflected rays therefrom; and
c. changing the contour of the reflecting surface in that region thereof from which the reflected signal originated to change a boundary of the area within which the signals are received by individually adjusting panels of a multi-panel structure which supports said reflecting surface.

15. A method as defined in claim 13, wherein:
a. the reflecting surface is optical; and
b. detection of the marginal reflected signals is visual.

16. A projection screen structure for use in an open-air theater wherein the theater includes an upwardly opene enclosure encompassing an audience area and includes a supporting structure in the enclosure for the screen structure and further includes projector means for projecting images into the audience area at the screen structure, the screen structure comprising
a. a mounting structure adapted to be disposed on and affixed to the supporting structure in an elevated relation to the enclosure,
b. an optical reflection screen forming the front surface of the screen structure,
c. A flexible multi-panel structure on which the optical reflection screen is disposed, said panel structure including a row and column array of panels each of which can be individually adjusted to allow adjustment of the reflection screen, and
d. a plurality of connecting means spaced in accordance with the array of panels and extending respectively between the mounting structure and each of the respective panels of the panel structure, each connecting means being individually extensible and retractable to adjust corresponding respective panels of the panel structure and consequently the reflection screen forwardly or rearwardly so as to effect sufficient curvature to the reflection screen surface to confine the reflection therefrom of light projected thereto to within the enclosure.

* * * * *